July 12, 1966  B. CRETIN-MAITENAZ  3,260,562
SPLIT RIM SPECTACLE MOUNTING WITH TENSIONING
BAR AND CONNECTING LINKAGE
Filed Dec. 18, 1962  2 Sheets-Sheet 1
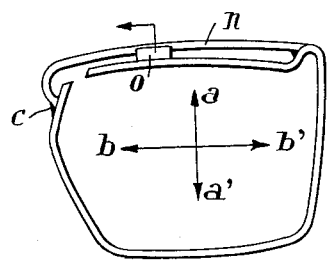
Fig.1
Fig.2
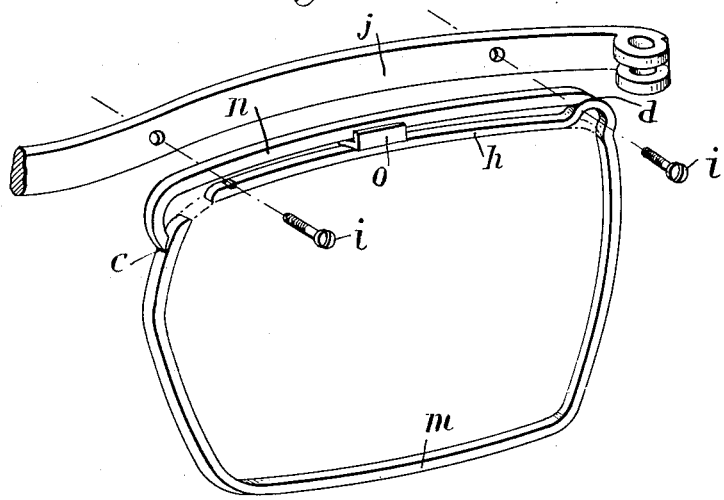
Fig.3
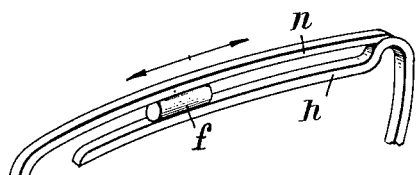
Fig.4
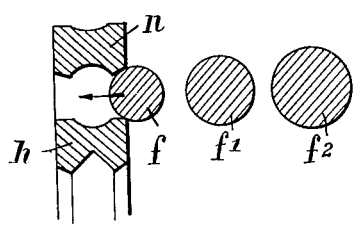

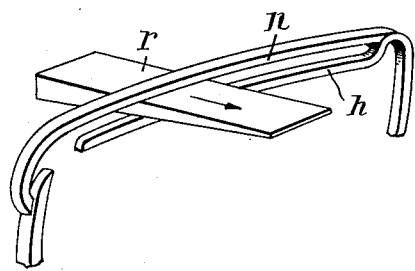
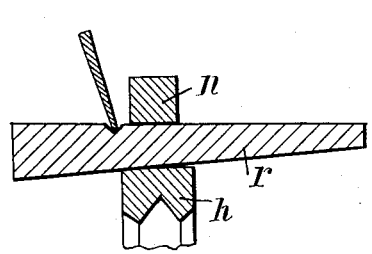
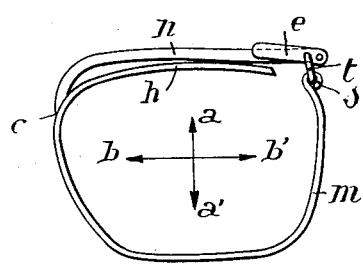
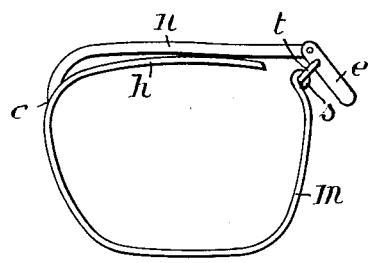
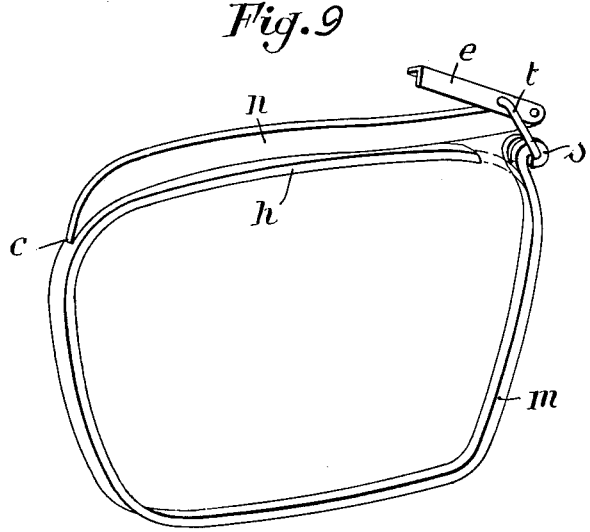

United States Patent Office 3,260,562
Patented July 12, 1966

3,260,562
SPLIT RIM SPECTACLE MOUNTING WITH TENSIONING BAR AND CONNECTING LINKAGE
Bernard Cretin-Maitenaz, Joinville-le-Pont, France, assignor to Societe Des Lunetiers, Cottet, Poichet, Tagnon & Cie, Paris, France
Filed Dec. 18, 1962, Ser. No. 245,442
1 Claim. (Cl. 351—92)

In so-called metal rimmed spectacle mountings the bevelled lens is inserted and rigidly held in a metal framelike ring member or rim associated with a front bar.

Various methods are known for fitting the lens in this frame mounting and rigidly securing same therein. Thus, for instance, this ring or rim may be open at any point along its periphery for welding thereon a pair of registering barrels adapted to be engaged and moved toward each other by a common screw for clamping the lens in the rim. Alternately, the perimeter of this ring or rim and the lens bezel may be made with a high degree of precision, the lens being simply force-fitted in the ring as in the case of watch glasses.

Now each method requires a very accurate gaging of the parts involved since no tolerance is provided along the ring perimeter.

This mounting method was certainly appropriate when round lenses were used for the clamping action exerted round by the barrel and screw device was the equivalent of a binding or hooping operation. In present times, as the lens shape has become substantially rectangular, the clamping action results not from a binding effect but from a pinching of the two horizontal edges of the rim, and therefore the vertical spacing between the two vertical edges of the ring must be established with precision, care being also taken that no points of local resistance occur at the corners when closing the ring on the lens. These difficulties are accentuated by the fact that the ring section is not flat but substantially curvilinear in order to accommodate the curvature of the lens edge.

It is the chief object of the present invention to avoid these drawbacks by dividing the lens holding action into two simultaneous actions: a horizontal clamping action and a vertical clamping action.

The spectacle mounting according to this invention comprises for each lens a rim broken along one section of its upper portion, means for securing said rim to the front bar of the mounting, a resiliently deformable rod secured to the upper corners of said rim, and means whereby said rod exerts an adjustable pressure on the upper floating arm of said rim for simultaneously clamping on the lens the vertical and horizontal portions of said rim.

Other objects and advantages will become apparent from the following description taken in conjunction with the accompanying drawing in which:

FIGURE 1 is a diagrammatic front elevational view showing the relative arrangement of the resilient members;

FIGURE 2 is a perspective view showing a practical embodiment of the arrangement shown in FIG. 1;

FIGURES 3, 4, 5 and 6 are detail views showing modified embodiments of the spectacle mounting of FIG. 2;

FIGURE 7 is a front evelational view showing another arrangement with the ring closed;

FIGURE 8 shows the same arrangement but with the ring open;

FIGURE 9 is a perspective view showing clearly the operation of different component elements of the assembly according to this invention.

As shown in FIGS. 1 and 2, the ring $m$ is open at one of its upper ends to provide a free element $h$. This element $h$ is pressed against the upper edge of the lens by a slider $o$ engaging a tension bar $n$. The shape of this bar $n$ permits a more or less pronounced clamping action when the slider is moved laterally, so that the lens is also clamping in the direction $a\ a'$. The bending of the bar $n$ under the influence of the slider $o$ causes the vertical sides of the ring to move toward each other due to its curvature between the anchoring points $c$ and $d$ of bar $n$ on the ring $m$, thus clamping the lenses in the direction $b, b'$ (FIG. 1).

In practice and with a view to further improve the efficiency of this arrangement, sliders of different dimensions $f, f_1, f_2$ may be used (see FIGS. 3 and 4) which consist essentially of wire sections of different gages available for the optician. By force-fitting a properly selected wire section it is possible to obtain a tensioning action which may be completed by adequately moving the slider $f$ laterally between the members $n$ and $h$.

The same result, that is, pinching the ring on an undersized lens in both directions $a\ a'$ and $b\ b'$ may be obtained by using a wedge member $r$ (FIGS. 5 and 6) with a view as in the preceding case, of pressing the ring side $h$ against the upper edge of the lens, the gaged wires or the wedge member contemplated hereinabove constituting only practical variations in the general principle shown diagrammatically in FIG. 1.

After ascertaining that the lens is safely held in its ring or rim, the assembly is secured on the front bar $j$ by adequate fastening means such as screws $i$.

Another modification of the above-described arrangements consists in providing a lever-type tension member $e$ (FIG. 9) arranged for acting between the end $s$ of the outer vertical side of ring $m$ and the tension bar $n$. The various parts are so arranged that the action of loop $t$ pulled by lever $e$ is exerted obliquely, that is, with a view to press the tension bar $n$ on the free end $h$ of ring $m$ for clamping the lens in the direction $a\ a.'$ and simultaneously, due to its oblique disposal, exerting a lateral pull on the looped end $s$, thus clamping the lens in the direction $b\ b'$ (FIGS. 7 and 8).

This last arrangement is characterized by a four-fold advantage:

(1) It permits a very rapid opening and closing of the open ring, this being particularly valuable when fitting the lens.

(2) The clamping action obtained by lowering the lever $e$ provides a particularly efficient and irreversible clamping and locking action.

(3) The optician will spare many undersized lenses since the clamping action obtained by rocking the lever $e$ can be completed, if desired, by bending the right-hand end portion of front bar $n$ by means of tweezers, thus increasing the clamping action produced in the ring.

(4) It permits the clamping force to be exerted simultaneously in directions $a\ a'$ and $b\ b'$ as already explained hereinabove.

To facilitate the disclosure, the two spectacle rings or rims have been shown separate from each other, but it would not constitute a departure from the basic principle of this invention to provide one-piece spectacle rings, the tension blade or bar extending across the nose to constitute the bridge member proper of the spectacles, with the ornamental members and if desired the hinges mounted on this member.

What I claim is:

Spectacle mounting means comprising for each lens: a rim having two free ends spaced from each other at an upper corner of the rim to define a break in the rim, the rim including an upper portion terminating at one of said free ends to constitute a floating arm; and tensioning means comprising a bar fixed to the opposite upper corner of the rim in a position spaced above the floating arm and having an intermediate portion adapted to contact the floating arm, a lever pivotally mounted on the free end of the bar and a linking member pivotally mounted at one of its ends to the lever and at the other of its ends to the other of said free ends of the rim to bridge the break in the rim, whereby overcenter tensioning movement of said lever serves to draw the free ends of the rim together and to deflect the floating arm downward to securely clamp the lens in the rim.

References Cited by the Examiner

UNITED STATES PATENTS

| | | | |
|---|---|---|---|
| 2,077,051 | 4/1937 | Messinger | 351—95 |
| 2,749,800 | 6/1956 | Gagnon | 351—91 |
| 2,754,724 | 7/1956 | Fishman | 351—91 X |
| 3,179,951 | 4/1965 | Ramp | 351—91 |

FOREIGN PATENTS 1,307,367  9/1962  France.

DAVID H. RUBIN, *Primary Examiner.*